US012601209B2

(12) United States Patent
Sharma et al.

(10) Patent No.: US 12,601,209 B2
(45) Date of Patent: Apr. 14, 2026

(54) FLUSH HANDLE ASSEMBLY FOR A VEHICLE DOOR

(71) Applicant: U-Shin Italia S.p.A., Pianezza (IT)

(72) Inventors: Sachin Sharma, Pianezza (IT); Guillaume Despreaux, Pianezza (IT)

(73) Assignee: U-SHIN Italia S.p.A., Pianezza (IT)

( * ) Notice: Subject to any disclaimer, the term of this patent is extended or adjusted under 35 U.S.C. 154(b) by 260 days.

(21) Appl. No.: 18/343,215

(22) Filed: Jun. 28, 2023

(65) Prior Publication Data

US 2023/0417089 A1 Dec. 28, 2023

(30) Foreign Application Priority Data

Jun. 28, 2022 (EP) .................................... 22181677

(51) Int. Cl.
*E05B 85/10* (2014.01)

(52) U.S. Cl.
CPC .......... *E05B 85/103* (2013.01); *E05B 85/107* (2013.01)

(58) Field of Classification Search
CPC ............................. E05B 85/103; E05B 85/107
See application file for complete search history.

(56) References Cited

U.S. PATENT DOCUMENTS 4,834,433 A * 5/1989 Keller ..................... E05B 85/18 292/DIG. 31
5,844,470 A * 12/1998 Garnault ............ G07C 9/00309 292/201
6,698,262 B2 * 3/2004 Wittwer .................. E05B 77/34 292/DIG. 31
7,059,641 B2 * 6/2006 Chanya ................. E05B 85/107 292/336.3
8,991,227 B2 3/2015 Muller et al.
9,593,514 B2 * 3/2017 Patel ....................... E05B 85/10
10,174,528 B2 * 1/2019 Velicanin ................ E05B 85/10
10,253,533 B1 * 4/2019 Pudney ................. E05F 1/1016
10,301,854 B2 * 5/2019 Christensen ............ E05B 81/90
10,760,307 B2 * 9/2020 Rocci ..................... E05B 85/107
10,794,096 B2 * 10/2020 Hamacher ............... E05B 5/006

(Continued)

FOREIGN PATENT DOCUMENTS

CN 105507699 A * 4/2016
CN 107893588 A * 4/2018

(Continued)

OTHER PUBLICATIONS

European Search Report issued in corresponding EP Application 22181677, dated Nov. 30, 2022.

*Primary Examiner* — Carlos Lugo
(74) *Attorney, Agent, or Firm* — Burris Law, PLLC

(57) ABSTRACT

A flush handle assembly for a vehicle door includes a flush handle including a grip member, an actuator, and an intermediate lever. The grip member is configured to cooperate with a latch mechanism to unlatch the vehicle door. The grip member is rotatable about a horizontal axis. The actuator is configured to move the grip member from a flush position in which the grip member extends flush to an external panel of the vehicle door, to a deployed position in which the grip member projects with respect to the external panel of the vehicle door. The intermediate lever connects the actuator to the grip member. The intermediate lever is rotatable about the horizontal axis.

10 Claims, 8 Drawing Sheets

(56) References Cited

U.S. PATENT DOCUMENTS

| | | | | |
|---|---|---|---|---|
| 11,248,403 | B2 * | 2/2022 | Boberschmidt | E05B 85/103 |
| 11,549,288 | B2 * | 1/2023 | Grenouillat | E05B 81/74 |
| 12,098,578 | B2 * | 9/2024 | Guerin | E05B 85/103 |
| 2017/0260780 | A1 * | 9/2017 | Christensen | E05B 85/103 |
| 2019/0112846 | A1 * | 4/2019 | Laval | E05B 85/107 |
| 2023/0417090 | A1 * | 12/2023 | Guerin | E05C 19/022 |

FOREIGN PATENT DOCUMENTS

| | | | | |
|---|---|---|---|---|
| DE | 19847212 | A1 * | 4/2000 | E05B 85/14 |
| DE | 10309821 | A1 * | 9/2004 | E05B 77/02 |
| EP | 3421701 | A1 * | 1/2019 | E05B 81/90 |
| EP | 3421702 | A1 | 1/2019 | |
| WO | WO-2017125653 | A1 * | 7/2017 | E05B 15/0046 |
| WO | WO-2017198917 | A1 * | 11/2017 | E05B 85/107 |
| WO | WO-2018190573 | A1 * | 10/2018 | E05B 79/06 |

* cited by examiner

FLUSH HANDLE ASSEMBLY FOR A VEHICLE DOOR

CROSS-REFERENCE TO RELATED APPLICATIONS

This application claims priority to and the benefit of EP 22181677.0 filed on Jun. 28, 2022. The disclosures of the above applications are incorporated herein by reference.

FIELD

The present disclosure relates to a flush handle assembly for a vehicle door, the flush handle assembly including a motorized flush handle, and more precisely a horizontal axis motorized flush handle, as well as an automotive vehicle including such a flush handle assembly.

BACKGROUND

The statements in this section merely provide background information related to the present disclosure and may not constitute prior art.

Flush handle assemblies for vehicle doors generally include a flush handle, a bracket to which the flush handle is secured and mechanical and/or an electronic device configured to unlock the vehicle door and to activate a latch to open the vehicle door.

Handles for vehicle doors are components having a significant influence on the style of vehicles.

In this respect, vehicle manufacturers often seek to arrange handles in the plane of the vehicle door so that it occupies a flush position also called a flush arrangement. A flush handle generally renders the handle as invisible as possible. Moreover, flush handles have the advantage of reducing the aerodynamic noise caused by the rush of air as the vehicle is being driven along.

A flush handle generally includes a grip member configured to cooperate with a latch mechanism so as to unlatch the vehicle door. The grip member is movable between a flush position in which it extends flush to an external panel of the vehicle door, a deployed position in which it projects with respect to the external panel and becomes graspable, and an open position in which it cooperates with the latch mechanism to unlatch the vehicle door.

The grip member is generally connected to an actuator configured to urge the grip member in the deployed position via an actuator lever so that a user can grasp the grip member to open the vehicle door. This type of flush handle is called a motorized flush handle.

Today, motorized flush handles are becoming more and more well known on the market. There are different types of motorized flush handles, with different kinematics: vertical axis motorized flush handles, and horizontal axis motorized flush handles. The term vertical refers to the direction perpendicular to the longitudinal direction of the vehicle and the term horizontal refers to the direction parallel to the longitudinal direction of the vehicle.

A vertical axis motorized flush handle includes a grip member rotatable around a vertical axis to open the vehicle door. To move from the flush position to the deployed position, the grip member is translatable towards the outside of the vehicle, or rotatable around the vertical axis towards the outside of the vehicle.

A horizontal axis motorized flush handle includes a grip member rotatable around a horizontal axis to open the vehicle door. In this configuration, the grip member is rotatable around the horizontal axis towards the outside of the vehicle, to move from the flush position to the deployed position.

The present disclosure concerns a horizontal axis motorized flush handle for a vehicle door, the horizontal axis motorized flush handle being configured to cooperate with a mechanical latch in order to latch or unlatch the vehicle door, the horizontal axis motorized flush handle having a minimal size.

SUMMARY

This section provides a general summary of the disclosure and is not a comprehensive disclosure of its full scope or all of its features.

According to one form of the present disclosure, a flush handle assembly for a vehicle door includes a flush handle including a grip member, an actuator, and an intermediate lever. The grip member is configured to cooperate with a latch mechanism to unlatch the vehicle door. The grip member is rotatable around a horizontal axis. The actuator is configured to move the grip member from a flush position in which the grip member extends flush to an external panel of the vehicle door, to a deployed position in which the grip member projects with respect to the external panel of the vehicle door. The intermediate lever connects the actuator to the grip member. The intermediate lever is rotatable around the horizontal axis.

According to variations of this flush handle assembly, which may be employed individually or in any combination: the flush handle comprises a latch lever connected to the grip member, the latch lever being configured to engage with a Bowden cable in order to mechanically activate the latch mechanism for opening the vehicle door; the flush handle comprises an actuator lever connecting the actuator to the intermediate lever; the actuator lever is rotatable around an actuator lever axis, the actuator lever axis being parallel to and below the horizontal axis and located closer to inside the automotive vehicle than the horizontal axis; the grip member is manually movable around the horizontal axis from the flush position to a retracted position in which the grip member is retracted inside a recess of the vehicle door, and the flush handle comprises a deployment device configured to allow the grip member to automatically move from the retracted position to the deployed position; the deployment device comprises at least one deployment spring; the flush handle assembly comprises a lockset configured to cooperate with a mechanical key to activate the latch mechanism for opening the vehicle door in case of electronic failure; the lockset is configured to be covered by the grip member in the flush position; the intermediate lever has a length of about 5 cm to 15 cm; the intermediate lever is metallic; the intermediate lever comprises a mass over the horizontal axis configured to balance inertia of the flush handle.

In another form, the present disclosure provides for an automotive vehicle comprising a vehicle door comprising a flush handle assembly for a vehicle door includes a flush handle including a grip member, an actuator, and an intermediate lever. The grip member is configured to cooperate with a latch mechanism to unlatch the vehicle door. The grip member is rotatable around a horizontal axis. The actuator is configured to move the grip member from a flush position in which the grip member extends flush to an external panel of the vehicle door, to a deployed position in which the grip member projects with respect to the external panel of the vehicle door. The intermediate lever connects the actuator to the grip member. The intermediate lever is rotatable around the horizontal axis.

According to variations of this automotive vehicle, which may be employed individually or in any combination: the flush handle comprises a latch lever connected to the grip member, the latch lever being configured to engage with a Bowden cable in order to mechanically activate the latch mechanism for opening the vehicle door; the flush handle comprises an actuator lever connecting the actuator to the intermediate lever; the actuator lever is rotatable around an actuator lever axis, the actuator lever axis being parallel to and below the horizontal axis and located closer to inside the automotive vehicle than the horizontal axis; the grip member is manually movable around the horizontal axis from the flush position to a retracted position in which the grip member is retracted inside a recess of the vehicle door, and the flush handle comprises a deployment device configured to allow the grip member to automatically move from the retracted position to the deployed position; the deployment device comprises at least one deployment spring; the flush handle assembly comprises a lockset configured to cooperate with a mechanical key to activate the latch mechanism for opening the vehicle door in case of electronic failure; the lockset is configured to be covered by the grip member in the flush position; the intermediate lever has a length of about 5 cm to 15 cm; the intermediate lever is metallic; the intermediate lever comprises a mass over the horizontal axis configured to balance inertia of the flush handle.

By the provision of a flush handle assembly which includes an intermediate lever rotatable around an axis concentric with the axis of rotation of the grip member, the flush handle assembly has space for a mechanical device configured to cooperate with a mechanical latch, and the size of the flush handle assembly is minimized.

The flush handle assembly can include the following features, considered alone or in any technically possible combination:

- the flush handle can include a latch lever connected to the grip member, the latch lever being configured to engage with a Bowden cable in order to mechanically activate the latch mechanism for opening the vehicle door;
- the flush handle can include an actuator lever connecting the actuator to the intermediate lever;
- the actuator lever can be rotatable around an actuator lever axis, the actuator lever axis being parallel to and below the horizontal axis and located closer to inside the automotive vehicle than the horizontal axis;
- the grip member can be manually movable around the horizontal axis from the flush position to a retracted position in which the grip member is retracted inside a recess of the vehicle door, and the flush handle can include a deployment device configured to allow the grip member to automatically move from the retracted position to the deployed position;
- the deployment device can include at least one deployment spring;
- the flush handle assembly can include a lockset configured to cooperate with a mechanical key to activate the latch mechanism for opening the vehicle door in case of electronic failure;
- the lockset can be configured to be covered by the grip member in the flush position;
- the intermediate lever can have a length of about 5 cm to 15 cm;
- the intermediate lever can be metallic;
- the intermediate lever can include a mass over the horizontal axis for balancing inertia of the flush handle.

According to a further aspect, the disclosure concerns an automotive vehicle including a vehicle door including a flush handle assembly as described above.

Further advantages and advantageous features of the invention are disclosed in the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

In the following description, the terms “front view” and “rear view” refer to a user looking at the vehicle door from outside the vehicle;

Figure 1:
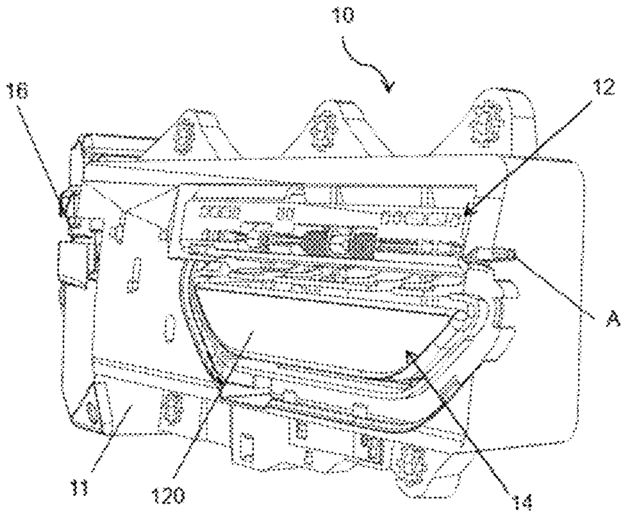
FIG. 1 is a perspective front view of a flush handle assembly according to one form of the present disclosure, the flush handle assembly including a grip member illustrated in a flush position.
Figure 2:
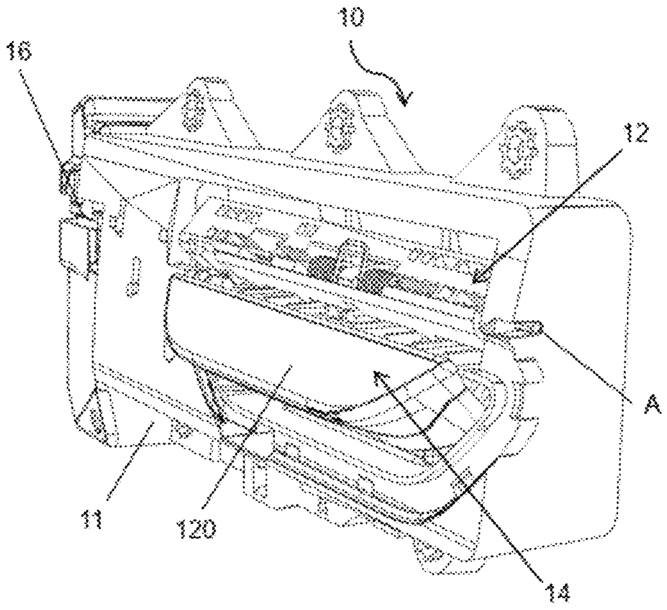
FIG. 2 is a perspective front view of the flush handle assembly of FIG. 1, the grip member being illustrated in a deployed position according to the teachings of the present disclosure.
Figure 3:
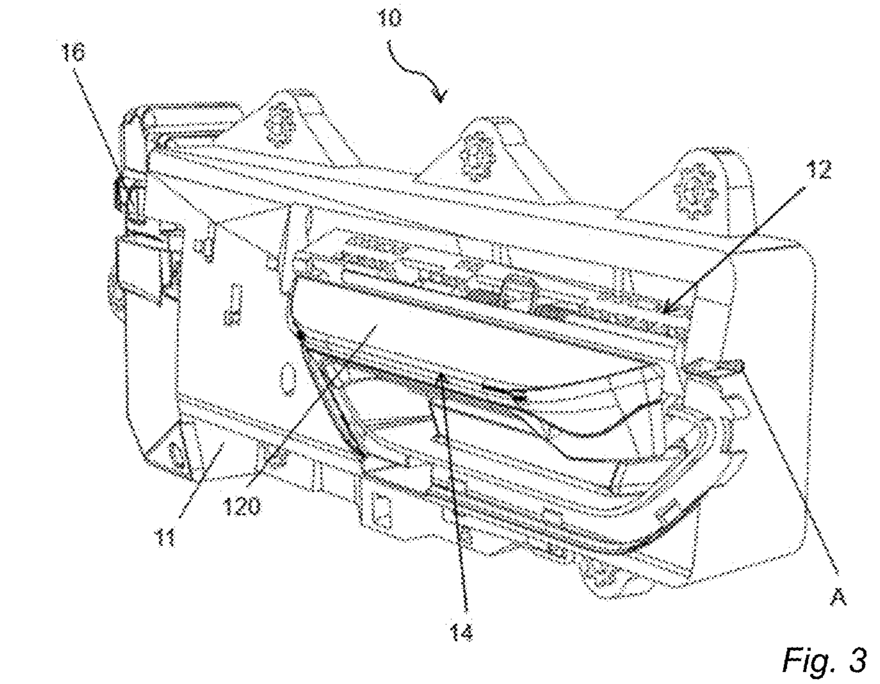
FIG. 3 is a perspective front view of the flush handle assembly of FIG. 1, the grip member being illustrated in an open position according to the teachings of the present disclosure.
Figure 4:
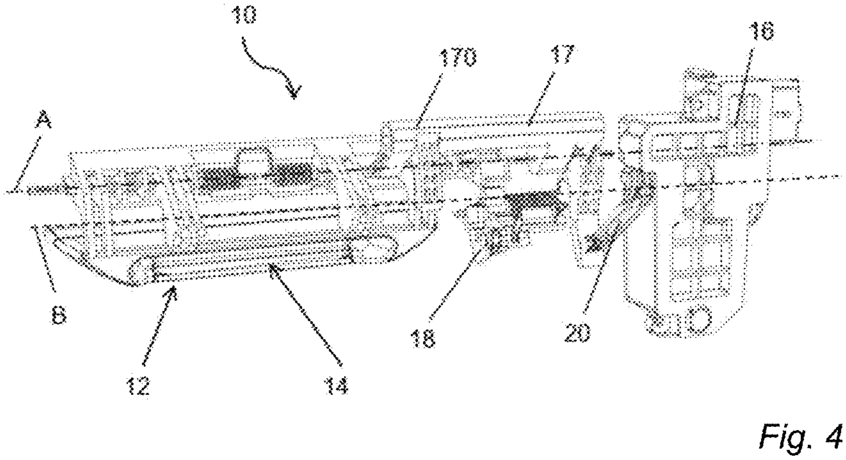
FIG. 4 is a perspective rear partial view of the flush handle assembly of FIG. 1.
Figure 5:
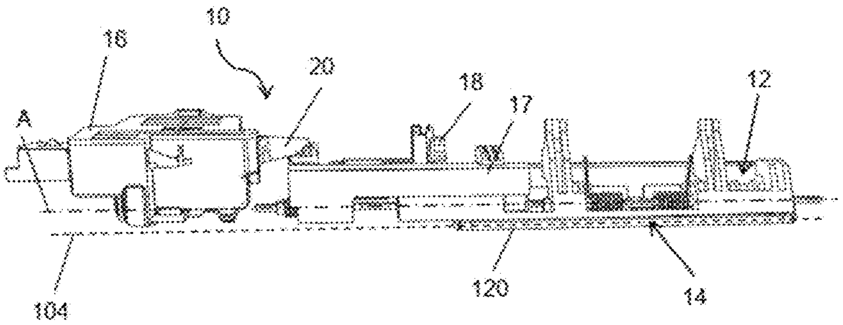
FIG. 5 is a top view of the flush handle assembly of FIG. 1.
Figure 6:
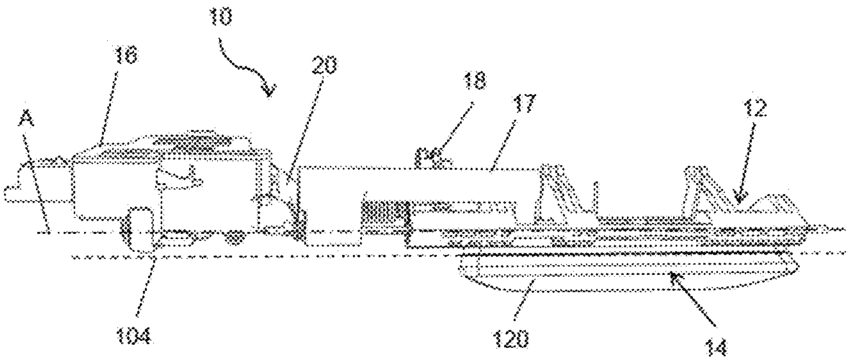
FIG. 6 is a top view of the flush handle assembly of FIG. 1, the grip member being illustrated in the deployed position according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 13:
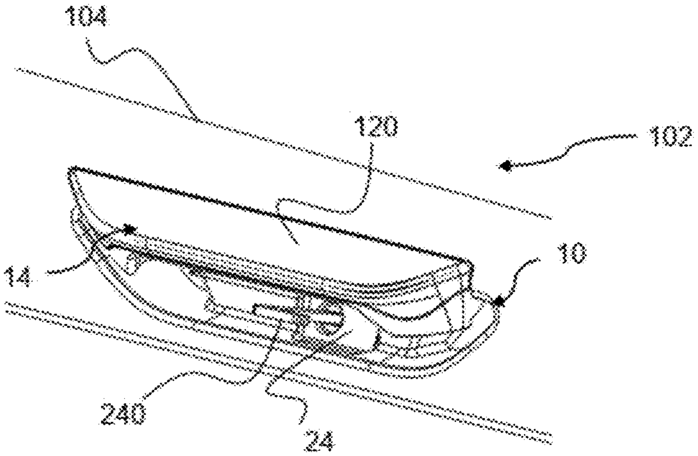
FIG. 13 is a perspective front view of a vehicle door including a flush handle assembly according to another form of the present disclosure.

FIGS. 1 to 8 illustrate a flush handle assembly 10 for a vehicle door 102 (FIG. 13) of an automotive vehicle 100 (FIG. 13).

The flush handle assembly 10 includes a flush handle 12 movable between a flush position (FIG. 1) in which it extends flush to an external panel 104 (FIG. 13) of the vehicle door 102 and a deployed position (FIG. 2) in which it projects with respect to the external panel and becomes graspable.

The flush handle 12 may further be movable to an open position (FIG. 3) in which it cooperates with a latch mechanism 200 (FIG. 7) to unlatch the vehicle door 102.

The flush handle assembly 10 can include a bracket 11 configured to house the flush handle 12.

The flush handle 12 includes a grip member 14. More precisely, the grip member 14 is configured to cooperate with the latch mechanism 200 to unlatch the vehicle door 102. Moreover, the grip member 14 is movable between the flush position and the deployed position. The grip member 14 is configured to be graspable in the deployed position.

The grip member 14 is rotatable around a horizontal axis A. The term horizontal means parallel to the longitudinal direction of the automotive vehicle 100. The horizontal axis A can be located at a distance range of 10 to 14 mm from the external panel 104 of the vehicle door 102.

The flush handle 12 includes an actuator 16 configured to move the grip member 14 from the flush position to the deployed position.

The flush handle 12 includes an intermediate lever 17 connecting the actuator 16 to the grip member 14. The intermediate lever 17 is rotatable around the horizontal axis A. The intermediate lever 17 and the grip member 14 have concentric axes of rotation.

In operation, the actuator 16 drives the intermediate lever 17 in rotation around the horizontal axis A. The intermediate lever 17 drives the grip member 14 in rotation around the horizontal axis A, from the flush position to the deployed position.

The intermediate lever 17 can be blocked by the bracket 11. The intermediate lever 17 can reach an end of stroke when blocked by the bracket 11.

Figure 7:
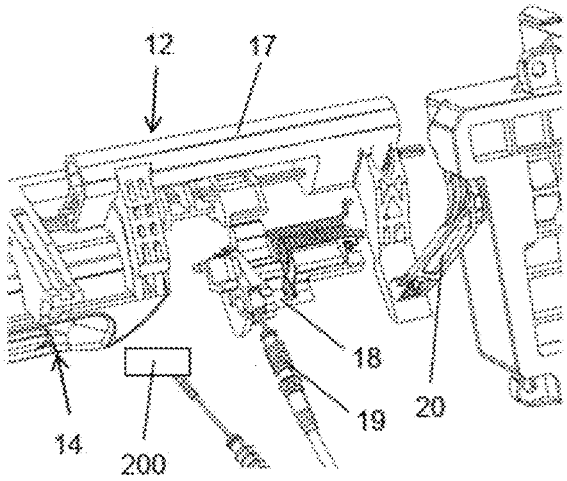
FIG. 7 is a perspective view of a portion of the flush handle assembly FIG. 1.
Figure 8:
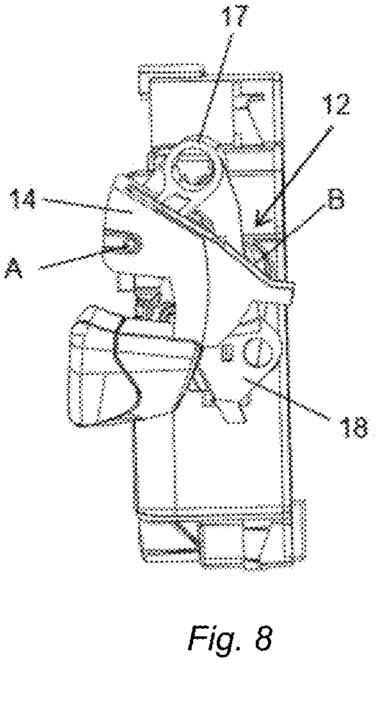
FIG. 8 is a schematic view of the flush handle assembly of FIG. 1, showing the axes of rotation according to the teachings of the present disclosure.

The flush handle 12 can include a latch lever 18 connected to the grip member 14. The latch lever 18 can be configured to engage with a Bowden cable 19 in order to mechanically activate the latch mechanism 200 for opening the vehicle door 102, in the open position. To this end, the grip member 14 can be manually movable around the horizontal axis A towards the outside of the vehicle door 102, from the deployed position to the open position. In the open position, the grip member 14 can drive the latch lever 18 so that the latch lever 18 is disconnected from the Bowden cable 19 (FIG. 7). Therefore, the latch mechanism 200 can be activated to unlatch the vehicle door 102. For example, the latch lever 18 can be disconnected from the Bowden cable 19 when the grip member 14 forms an angle included between 2° and 20°, in one form between 2° and 10°, and in another form between 2° to 8°, relative to the flush position.

The flush handle 12 can include an actuator lever 20 connecting the actuator 16 to the intermediate lever 17. The actuator lever 20 can be rotatable around an actuator lever axis B. The actuator lever axis B can be parallel to the horizontal axis A. The actuator lever axis B can be below the horizontal axis A. The actuator lever axis B can be located closer to inside the automotive vehicle 100 than the horizontal axis A. The intermediate lever 17 can be connected between the actuator lever 20 and the grip member 14.

The grip member 12 can include a cover 120. For example, the cover 120 can be configured to be flush with the external panel 104 of the vehicle door 102 when the grip member 14 is in the flush position.

The intermediate lever 17 can have a length of about 5 to 15 cm.

The intermediate lever 17 can be metallic.

The intermediate lever 17 can include a mass 170 over the horizontal axis A for balancing inertia of the flush handle 12.

As illustrated in FIGS. 9 to 12 and 15, the flush handle 12 can include a backup mechanism 18 allowing the grip member 14 to be manually moved in case of battery failure of the actuator 16. To this end, the grip member 14 is manually movable around the horizontal axis A. More precisely the grip member 14 is manually movable around the horizontal axis A from the flush position (first cutaway of FIG. 9) to a retracted position (second cutaway of FIG. 9) in which the grip member 14 is retracted inside a recess 106 (FIG. 9) of the vehicle door 102. To this end, a user can push the grip member 14 inwards with respect to the external panel 104 as in the second cutaway of FIG. 9, by applying inwards directed pressure on the grip member 14.

Figure 9:
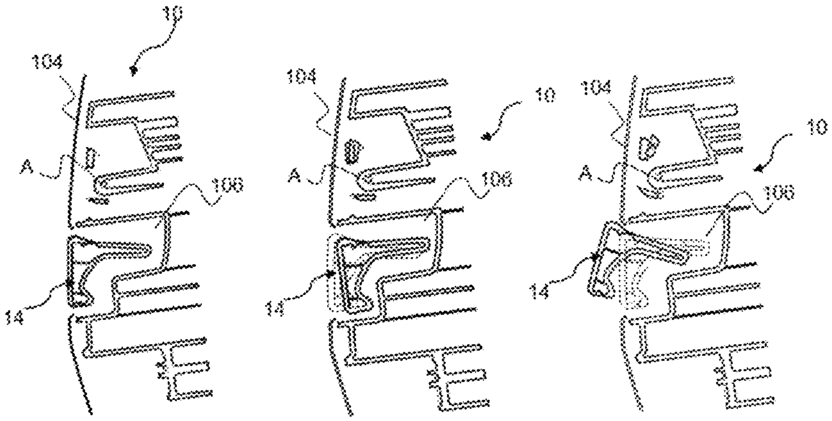
FIG. 9 is a schematic view of the flush handle assembly of FIG. 1, illustrating operation of a backup mechanism allowing the grip member to be manually moved in case of battery failure of the actuator according to the teachings of the present disclosure.
Figure 10:
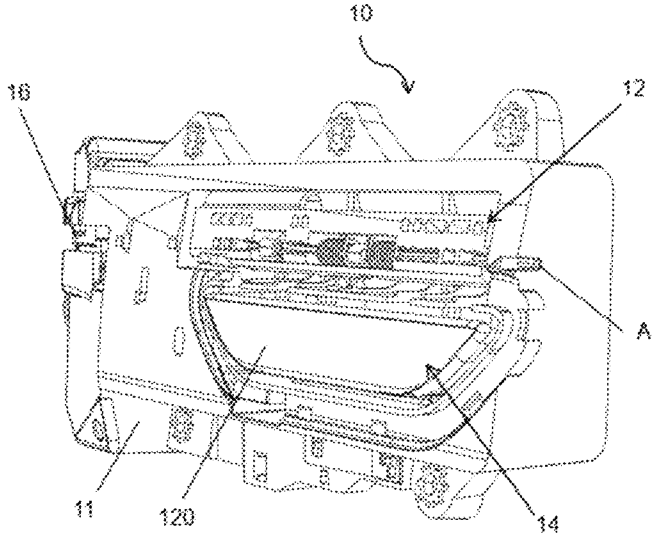
FIG. 10 is a perspective front view of the flush handle assembly of FIG. 1, the grip member being illustrated in a retracted position according to the teachings of the present disclosure.
Figure 11:
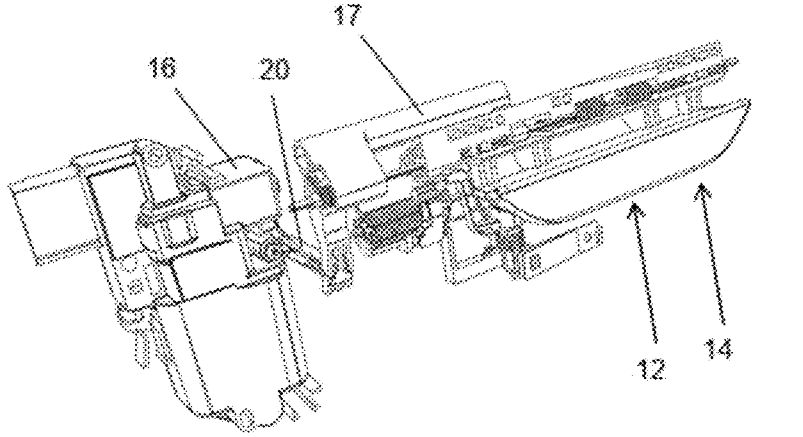
FIG. 11 is a perspective rear view of a portion of the flush handle assembly of FIG. 1.
Figure 12:
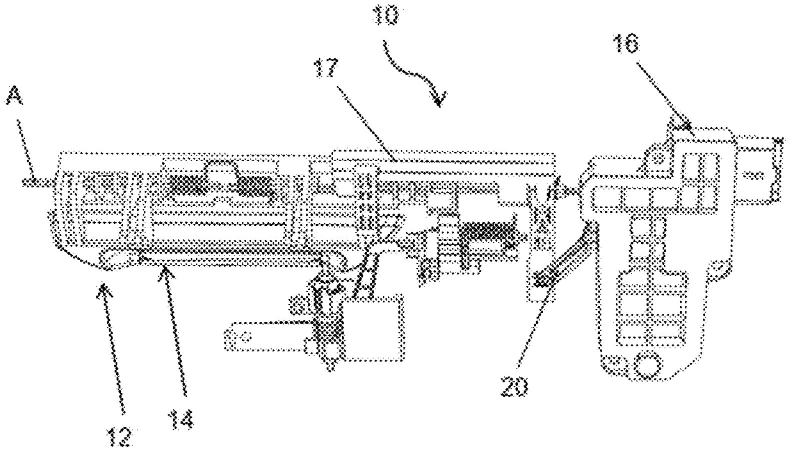
FIG. 12 is a perspective rear view of the flush handle assembly of FIG. 1.

The backup mechanism 18 can include a deployment device 181 configured to allow the grip member 14 to automatically move from the retracted position to the deployed position (third cutaway of FIG. 9). The deployment device 181 can include a push-push unit 182. The push-push unit 182 can include at least one deployment spring 183 configured to drive the grip member 14 in deployed position without actuation of the actuator 16. More precisely, in the retracted position, a mechanical interaction (e.g., a "click") can release the at least one deployment spring 183 of the push-push unit 182, and the at least one deployment spring 183 can drive the grip member 14 in deployed position without actuation of the actuator 16.

The flush handle 12 includes the deployment device 181.

The push-push unit 182 can include the features as described in document EP 3 421 702, which is incorporated by reference herein in its entirety.

The flush handle 12 can include a return device (not represented) allowing the grip member 14 to move from the open position to the deployed position. The return device can be a return spring (not represented).

FIG. 9 illustrates operation of the backup mechanism 18 allowing the grip member 14 to be manually moved in case of battery failure of the actuator 16.

A user pushes on the grip member 14 in order to move the grip member 14 around the horizontal axis A inside the recess 106 of the vehicle door 102. The grip member 14 moves from the flush position to the retracted position. The deployment device 181 allow the grip member 14 to automatically move from the retracted position to the deployed position.

The flush handle assembly 10 can include an electronic device (not represented) permitting cooperation of the grip member 14 with the latch mechanism 200 to unlatch the vehicle door 102. The flush handle 12 is therefore an electronic flush handle.

The flush handle assembly 10 can include a lockset 24 configured to cooperate with a mechanical key 240 to activate the latch mechanism 200 for opening the vehicle door 102 in case of electronic failure.

The lockset 24 can be configured to be covered by the grip member 14 in the flush position.

Figure 14:
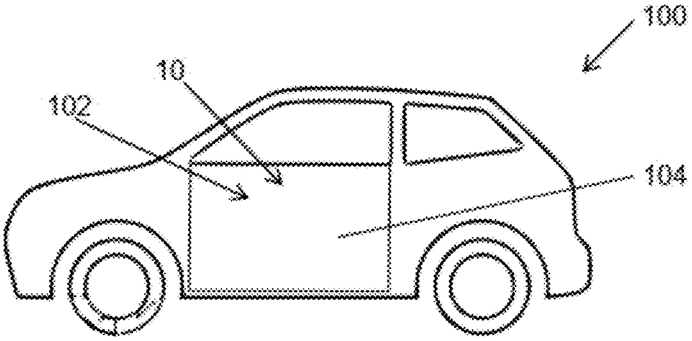
FIG. 14 is a perspective view of an automotive vehicle including a flush handle assembly according to an example of form of the disclosure.
Figure 15:
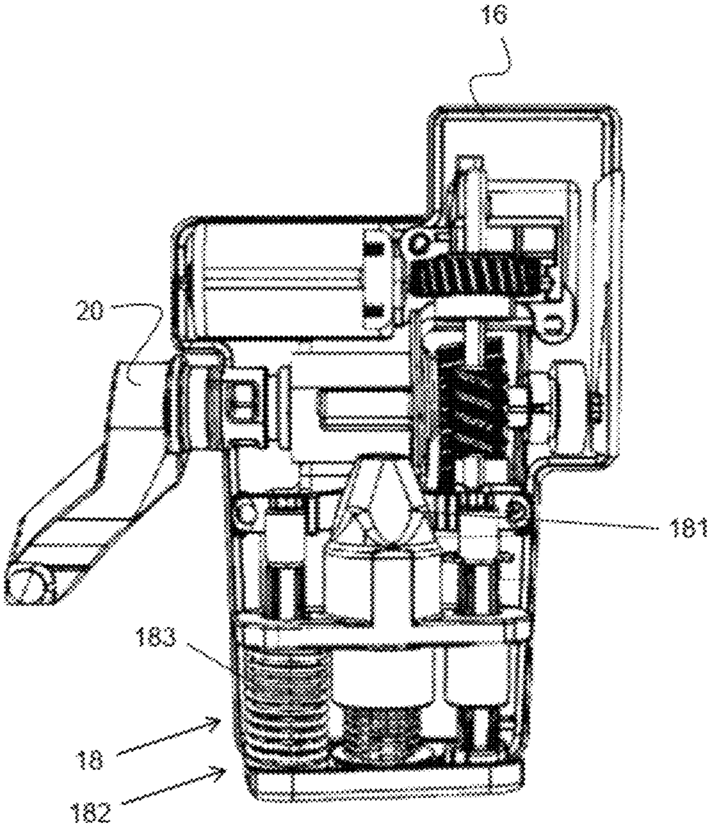
FIG. 15 is a perspective view of a backup mechanism of a flush handle assembly according to another form of the present disclosure.

FIG. 14 illustrates an automotive vehicle 100 including a vehicle door 102 including a flush handle assembly 10 as described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A flush handle assembly for a vehicle door of an automotive vehicle, the flush handle assembly comprising:

a flush handle comprising:

a grip member configured to cooperate with a latch mechanism to unlatch the vehicle door, the grip member being rotatable around a horizontal axis;

an actuator configured to move the grip member from a flush position to a deployed position, wherein in the flush position, the grip member extends flush to an external panel of the vehicle door, wherein in the deployed position, the grip member projects with respect to the external panel of the vehicle door;

an intermediate lever connecting the actuator to the grip member, wherein the intermediate lever is rotatable about the horizontal axis; and an actuator lever connecting the actuator to the intermediate lever, wherein the actuator lever is rotatable about an actuator lever axis, the actuator lever axis being parallel to and below the horizontal axis and located closer to inside the automotive vehicle than the horizontal axis.

2. The flush handle assembly according to claim 1, wherein the flush handle comprises a latch lever connected to the grip member, the latch lever being configured to engage with a Bowden cable in order to mechanically activate the latch mechanism for opening the vehicle door.

3. The flush handle assembly according to claim 1, wherein the grip member is manually movable about the horizontal axis from the flush position to a retracted position in which the grip member is retracted inside a recess of the vehicle door, and the flush handle comprises a deployment device configured to allow the grip member to automatically move from the retracted position to the deployed position.

4. The flush handle assembly according to claim 3, wherein the deployment device comprises at least one deployment spring.

5. The flush handle assembly according to claim 1, wherein the flush handle assembly comprises a lockset configured to cooperate with a mechanical key to activate the latch mechanism for opening the vehicle door in case of electronic failure.

6. The flush handle assembly according to claim 5, wherein the lockset is configured to be covered by the grip member in the flush position.

7. The flush handle assembly according to claim 1, wherein the intermediate lever has a length of about 5 cm to 15 cm.

8. The flush handle assembly according to claim 1, wherein the intermediate lever is metallic.

9. The flush handle assembly according to claim 1, wherein the intermediate lever comprises a mass over the horizontal axis configured to balance inertia of the flush handle.

10. An automotive vehicle comprising a vehicle door comprising a flush handle assembly according to claim 1.

* * * * *